US012159618B2

(12) United States Patent
Gupta et al.

(10) Patent No.: US 12,159,618 B2
(45) **Date of Patent: *Dec. 3, 2024**

(54) AUTOMATED PIPELINE SELECTION FOR SYNTHESIS OF AUDIO ASSETS

(71) Applicant: ELECTRONIC ARTS INC., Redwood City, CA (US)

(72) Inventors: Kilol Gupta, Redwood City, CA (US); Tushar Agarwal, San Carlos, CA (US); Zahra Shakeri, Mountain View, CA (US); Mohsen Sardari, Redwood City, CA (US); Harold Henry Chaput, Castro Valley, CA (US); Navid Aghdaie, San Jose, CA (US)

(73) Assignee: Electronic Arts Inc., Redwood City, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 17/970,169

(22) Filed: Oct. 20, 2022

(65) Prior Publication Data

US 2023/0039540 A1 Feb. 9, 2023

Related U.S. Application Data

(63) Continuation of application No. 17/094,601, filed on Nov. 10, 2020, now Pat. No. 11,521,594.

(51) Int. Cl.
*G10L 13/047* (2013.01)
*G10L 13/08* (2013.01)

(52) U.S. Cl.
CPC ............ *G10L 13/047* (2013.01); *G10L 13/08* (2013.01)

(58) Field of Classification Search
CPC ..... G10L 13/047; G10L 13/08; G10L 21/003; G10L 25/69
See application file for complete search history.

(56) References Cited

U.S. PATENT DOCUMENTS

| | | | | |
|---|---|---|---|---|
| 9,324,316 | B2 | 4/2016 | Mitsui | |
| 9,460,704 | B2 | 10/2016 | Senior | |
| 9,665,563 | B2 | 5/2017 | Min | |
| 11,455,984 | B1 * | 9/2022 | Haslam | G10L 15/07 |
| 11,521,594 | B2 * | 12/2022 | Gupta | G10L 25/69 |
| 11,545,132 | B2 * | 1/2023 | Abrami | G10L 13/047 |

(Continued)

OTHER PUBLICATIONS

USPTO, Office Action for U.S. Appl. No. 17/094,601, mailed Feb. 17, 2022.

(Continued)

*Primary Examiner* — Fariba Sirjani
(74) *Attorney, Agent, or Firm* — Lowenstein Sandler LLP

(57) ABSTRACT

An example method of automated selection of audio asset synthesizing pipelines includes: receiving an audio stream comprising human speech; determining one or more features of the audio stream; selecting, based on the one or more features of the audio stream, an audio asset synthesizing pipeline; training, using the audio stream, one or more audio asset synthesizing models implementing respective stages of the selected audio asset synthesizing pipeline; and responsive to determining that a quality metric of the audio asset synthesizing pipeline satisfies a predetermined quality condition, synthesizing one or more audio assets by the selected audio asset synthesizing pipeline.

20 Claims, 6 Drawing Sheets

(56) References Cited

U.S. PATENT DOCUMENTS

| | | | | |
|---|---|---|---|---|
| 2010/0302254 | A1 | 12/2010 | Min | |
| 2012/0239390 | A1 | 9/2012 | Fume | |
| 2014/0012584 | A1 | 1/2014 | Mitsui | |
| 2015/0193431 | A1 | 7/2015 | Stoytchev | |
| 2016/0155065 | A1 | 6/2016 | Drame | |
| 2020/0051583 | A1 | 2/2020 | Wu | |
| 2020/0279553 | A1 | 9/2020 | McDuff | |
| 2021/0134269 | A1* | 5/2021 | Min | G06N 3/09 |
| 2021/0312899 | A1* | 10/2021 | Bangarambandi | G06F 3/0482 |
| 2021/0390943 | A1* | 12/2021 | Gao | G06N 3/088 |
| 2021/0390944 | A1 | 12/2021 | Richards | |
| 2022/0051655 | A1* | 2/2022 | Kanagawa | G10L 13/10 |
| 2022/0148561 | A1 | 5/2022 | Gupta | |

OTHER PUBLICATIONS

USPTO, Notice of Allowance for U.S. Appl. No. 17/094,601, mailed Jul. 27, 2022.

* cited by examiner

AUTOMATED PIPELINE SELECTION FOR SYNTHESIS OF AUDIO ASSETS

RELATED APPLICATIONS

This application is a continuation of U.S. patent application Ser. No. 17/094,601 filed on Nov. 10, 2020, the entire content of which is incorporated by reference herein.

TECHNICAL FIELD

The present disclosure is generally related to artificial intelligence-based models, and is more specifically related to automated selection of text-to-speech (TTS) and/or voice conversion (VC) pipelines for synthesis of audio assets.

BACKGROUND

Interactive software applications, such as an interactive video games, may utilize pre-recorded and/or synthesized audio streams, including audio streams of human speech, thus significantly enhancing the user's experience.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
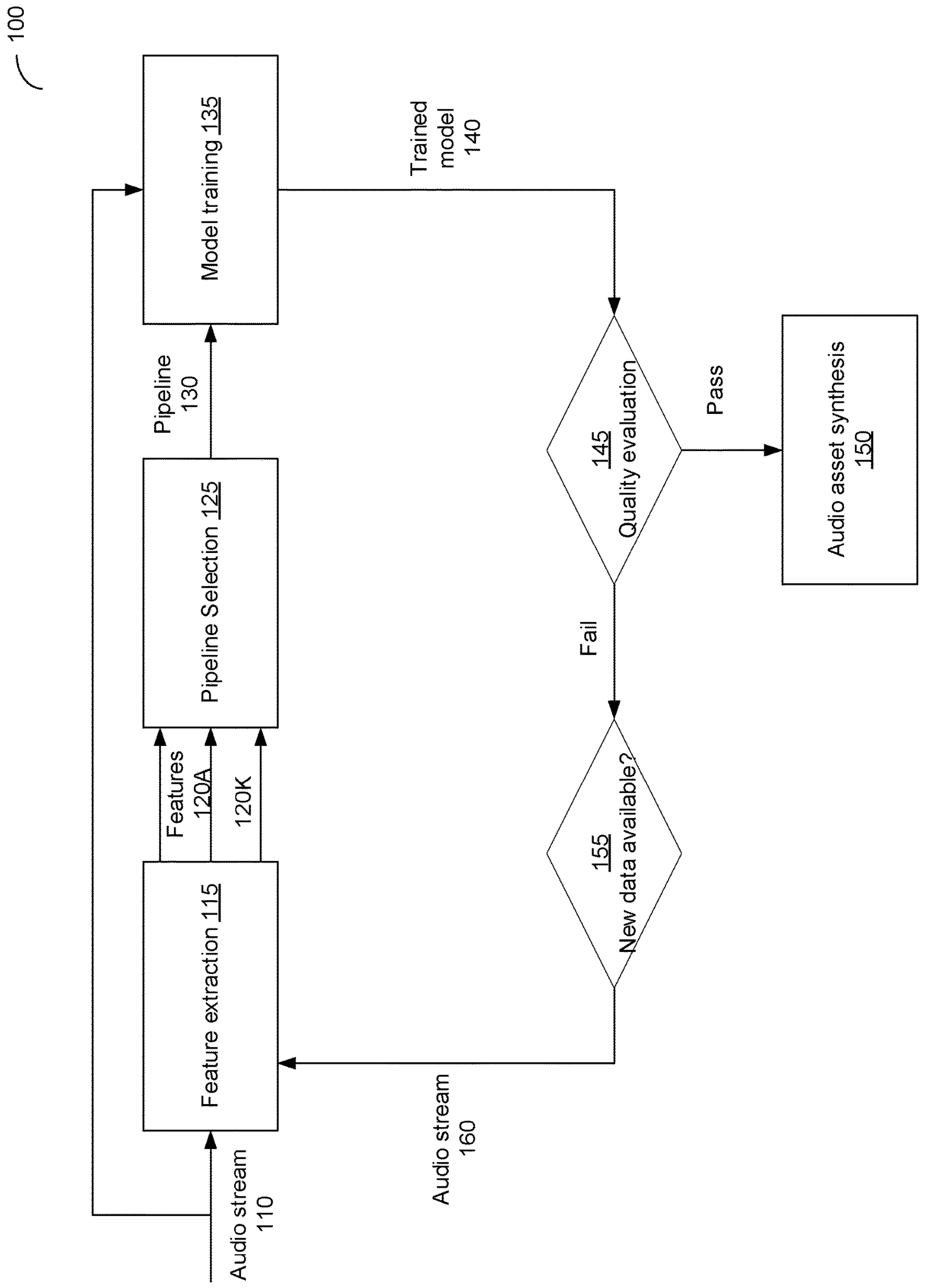
FIG. 1 schematically illustrates a high-level flowchart of an example workflow 100 of selecting an audio asset synthesizing pipeline, implemented in accordance with one or more aspects of the present disclosure.

Described herein are methods and systems for automated selection of audio asset synthesizing pipelines.

Interactive software applications, such as an interactive video game, may utilize pre-recorded and/or synthesized audio assets, including audio streams of human speech, thus significantly enhancing the user's experience. In some implementations, the synthesized speech may be produced by applying text-to-speech (TTS) transformation and/or voice conversion (VC) techniques. TTS techniques convert written text to natural-sounding speech, while VC techniques modify certain aspects of speech-containing audio stream (e.g., speaker characteristics including pitch, intensity, intonation, etc.).

In some implementations, certain TTS transformation and/or VC functions may be performed by pipelines comprising two or more functions (stages) that may be performed by corresponding artificial intelligence (AI)-based trainable models. An example TTS pipeline may include two stages: the front end that analyzes the input text and transforms it into a set of acoustic features, and the wave generator that utilizes the acoustic features of the input text to generate the output audio stream. An example VC pipeline may include three stages: the front end that analyzes the input audio stream and transforms it into a set of acoustic features, the mapper that modifies at least some of the acoustic features of the input audio stream, and the wave generator that utilizes the modified features to generate the output audio stream.

In some implementations, the pipeline stages may be implemented by neural networks. "Neural network" herein shall refer to a computational model, which may be implemented by software, hardware, or a combination thereof. A neural network includes multiple inter-connected nodes called "artificial neurons," which loosely simulate the neurons of a living brain. An artificial neuron processes a signal received from another artificial neuron and transmit the transformed signal to other artificial neurons. The output of each artificial neuron may be represented by a function of a linear combination of its inputs. Edge weights, which increase or attenuate the signals being transmitted through respective edges connecting the neurons, as well as other network parameters, may be determined at the network training stage, by employing supervised and/or unsupervised training methods.

The systems and methods of the present disclosure implement automated selection of audio asset synthesizing pipelines based on certain features of the audio streams to be utilized for the pipeline training. In various illustrative examples, such features may include the size of the training audio stream, the sampling rate of the training audio stream, the pitch, the perceived gender of the speaker, the natural language of the speech, etc. Selecting the audio asset synthesizing pipeline based on the features of the available audio streams results in a higher quality of audio assets that are generated by the trained pipeline.

Various aspects of the methods and systems for automated audio asset synthesizing pipeline selection for synthesis of audio assets are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

FIG. 1 schematically illustrates a high-level flowchart of an example workflow 100 of selecting an audio asset synthesizing pipeline, implemented in accordance with one or more aspects of the present disclosure. One or more functions of the example pipeline selection workflow 100 may be implemented by one or more computer systems (e.g., hardware servers and/or or virtual machines). Various functional and/or auxiliary components may be omitted from FIG. 1 for clarity and conciseness.

As schematically illustrated by FIG. 1, the input audio stream 110 that is fed to the feature extraction functional module 115 includes one or more recorded speech fragments by one or more speakers. The input audio stream 110 may utilize a standard audiovisual encoding format (e.g., MP4, MPEG4) or a proprietary audiovisual encoding format. In some implementations, the input audio stream 110 may include one or more voice recording of one or more players of an interactive video game.

The feature extraction functional module 115 analyzes the input audio stream to extract various features 120A-120K representing the audio stream properties, parameters, and/or characteristics. In an illustrative example, the audio stream features 120A-120K include the size of the audio stream or its portion, the sampling rate of the audio stream, the style of the speech (e.g., sports announcer style, dramatic, neutral), the perceived gender of the speaker, the natural language utilized by the speaker, the pitch, etc. The extracted features may be represented by a vector, every element of which represents a corresponding feature value.

A vector of the extracted features 120A-120K is fed to the pipeline selection functional module 125, which applies one or more trainable models and/or rule engines to the extracted features 120A-120K in order to select the audio asset synthesizing pipeline 130 that is best suitable for processing the audio stream 110 for model training. In an illustrative example, the pipeline selection functional module 125 may employ a trainable classifier that processes the set of extracted features 120A-120K and produces a pipeline affinity vector, such that each element of the pipeline affinity vector is indicative of a degree of suitability of an audio stream characterized by the particular set of extracted features for training the audio asset synthesizing pipeline identified by the index of the vector element. Thus, the element Si of the numeric vector produced by the trainable classifier would store a number that is indicative of the degree of suitability of an audio stream characterized by the set of extracted features for training the i-th audio asset synthesizing pipeline. In an illustrative example, the suitability degrees may be provided by real or integer numbers selected from a predefined range (e.g., 0 to 10), such that a smaller number would indicate a lower suitability degree, while a larger number would indicate a larger suitability degree. Accordingly, the pipeline selection functional module 125 may select the audio asset synthesizing pipeline that is associated with the maximum value of the degree of suitability specified by the pipeline affinity vector.

Figure 2:
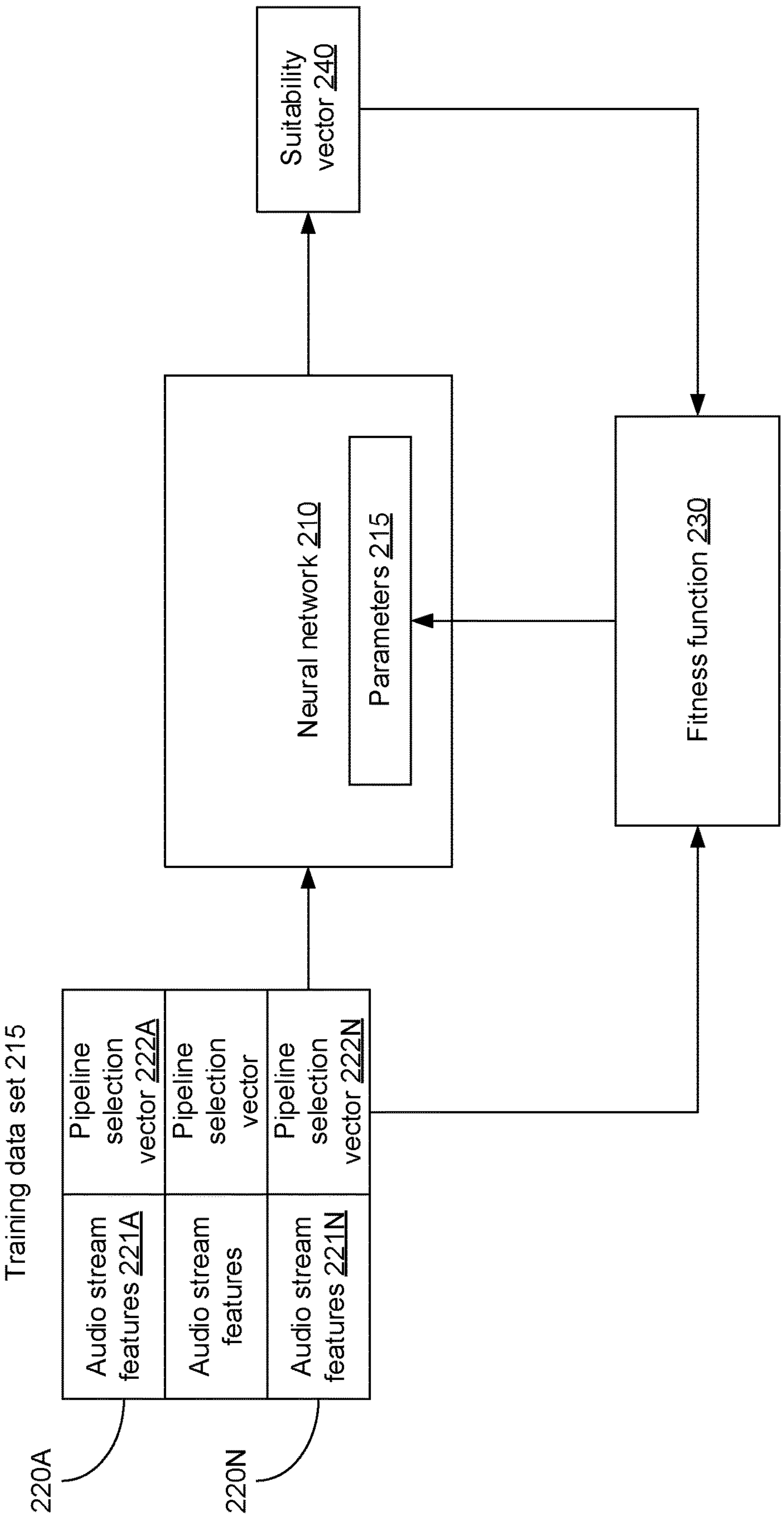
FIG. 2 schematically illustrates a high-level flowchart of an example workflow for training a neural network implementing pipeline selection in accordance with one or more aspects of the present disclosure.

As schematically illustrated by FIG. 2, in some implementations, the pipeline selection functional module 125 may comprise a neural network 210. Training the neural network 210 may involve determining or adjusting the values of various network parameters 215 by processing a training data set 215 comprising a plurality of training samples 220A-220N. In an illustrative example, the network parameters may include a set of edge weights, which increase or attenuate the signals being transmitted through respective edges connecting artificial neurons. Each training sample 220 may include an input feature set 221 labeled with a vector of suitability values 222, such that each vector element would store a number that is indicative of the degree of suitability of an audio stream characterized by the input feature set for training the audio asset synthesizing pipeline identified by the index of the vector element. Accordingly, the supervised training process may involve determining a set of neural network parameters 215 that minimizes a fitness function 230 reflecting the difference between the pipeline suitability vector 240 produced by the trainable classifier processing a given input feature set 220N from the training data set and the pipeline affinity vector 222N associated with the input feature set. In some implementations, the labels (i.e., the pipeline affinity vectors 222A-222N) for the training data set 215 may be produced by the quality evaluation functional module 145. The pipeline training workflow 100 may be utilized for simultaneously or sequentially training multiple pipelines. The quality evaluation functional module 145 may associate each pipeline with a pass/fail label or a degree of suitability of the processed audio stream to the pipeline, based on the result of performing the quality evaluation of the trained pipeline.

Referring again to FIG. 1, in some implementations, the pipeline selection functional module 125 may be implemented as a rule engine that applies one or more predefined and/or dynamically configurable rules to the extracted features 120A-120K. A pipeline selection rule may define a logical condition and an action to be performed if the logical condition is evaluated as true. The logical condition may comprise one or more value ranges or target values for respective audio stream features. Should the set of features satisfy the condition (e.g., by the respective features falling within the value ranges or matching respective target value), the action specified by the rule is performed. In an illustrative example, the action specified by the pipeline selection rule may identify the audio asset synthesizing pipeline to be selected for processing the input audio stream. In another illustrative example, the action specified by the pipeline selection rule may identify another pipeline selection rule to be invoked and may further identify the arguments to be passed to the invoked rule.

Figure 3:
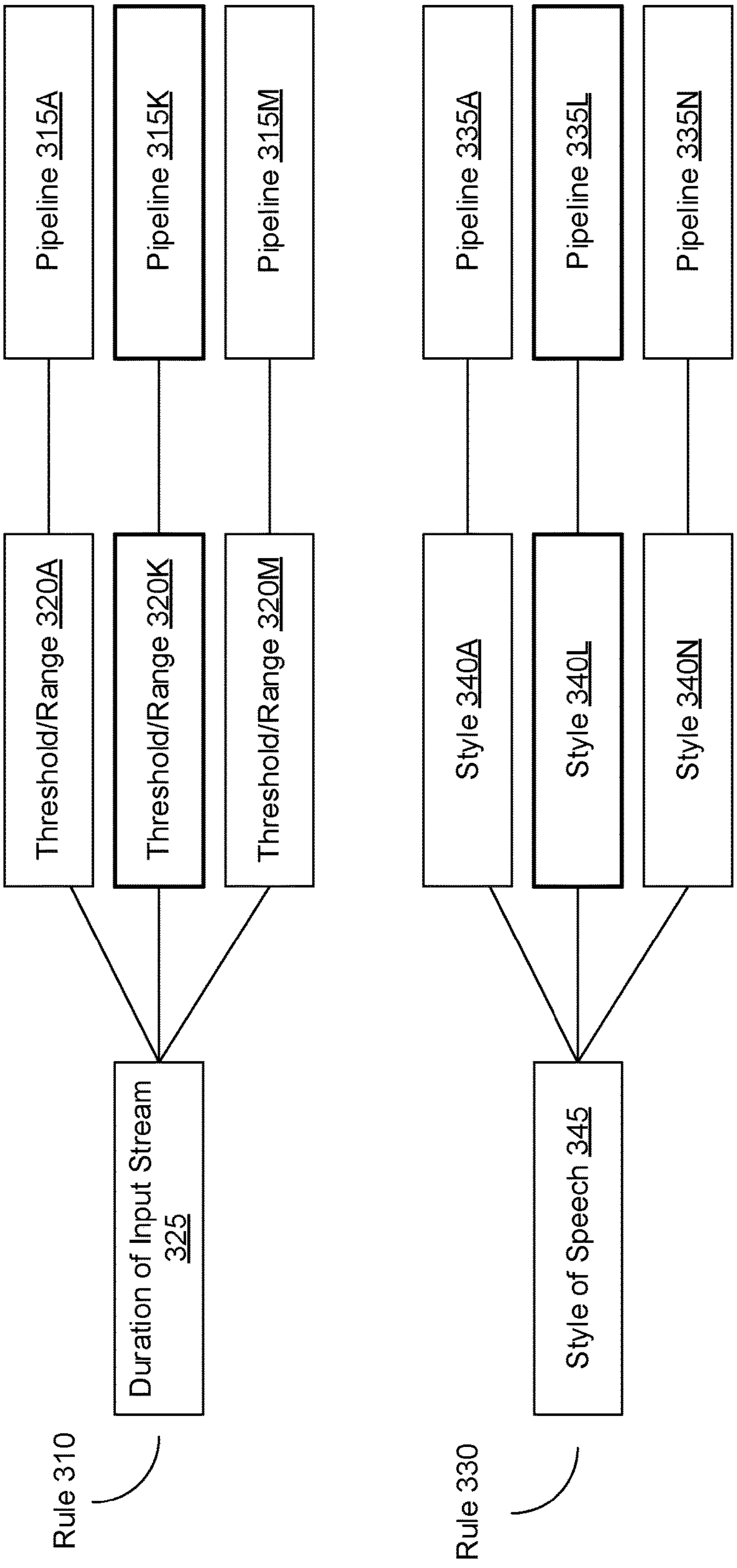
FIGS. 3-4 illustrate example pipeline selection rules implemented in accordance with one or more aspects of the present disclosure.

As schematically illustrated by FIG. 3, in some implementations, one or more pipeline selection rules may specify the conditions that evaluate the size (and hence the duration) of the input audio stream. Accordingly, the rule 310 may identify a pipeline 315K corresponding to the specified threshold durations or ranges 320K that is matched or satisfied by the input stream duration 325. In an illustrative example, responsive to determining that the duration of the input audio stream is below a low threshold, which may be ranging from several seconds to several minutes, the pipeline selection rule may identify a few-shot learning audio asset synthesizing pipeline or a voice cloning/conversion pipeline. In another illustrative example, responsive to determining that the duration of the input audio stream falls within a predefined range (e.g., ranging from one hour to several hours), the pipeline selection rule may identify a pre-trained audio asset synthesizing pipeline which may be fine-tuned based on the available input audio stream. In yet another illustrative example, responsive to determining that the duration of the input audio stream exceeds a high threshold, which may be a predetermined number of hours, the pipeline selection rule may identify an audio asset synthesizing pipeline that may be fully trained based on the available input audio stream.

In some implementations, one or more pipeline selection rules may specify the conditions that determine the speaker style of the input audio stream. The style of speech may be characterized by a set of features including the pitch, the loudness, the intonation, the tone, etc. Accordingly, the rule 330 may identify a pipeline 335L corresponding to the specified style patterns 340L that is matched by the speaker style 345 of the input stream. Each style pattern may specify the feature ranges of specific features of the input audio stream. In an illustrative example, responsive to determining that the speaker style matches the announcer style pattern, the pipeline selection rule may identify an audio asset synthesizing pipeline that has been designed to produce emotional speech. In another illustrative example, responsive to determining that the speaker style matches the neutral style pattern, the pipeline selection rule may identify an audio asset synthesizing pipeline that has been designed to produce neutral speech.

Figure 4:
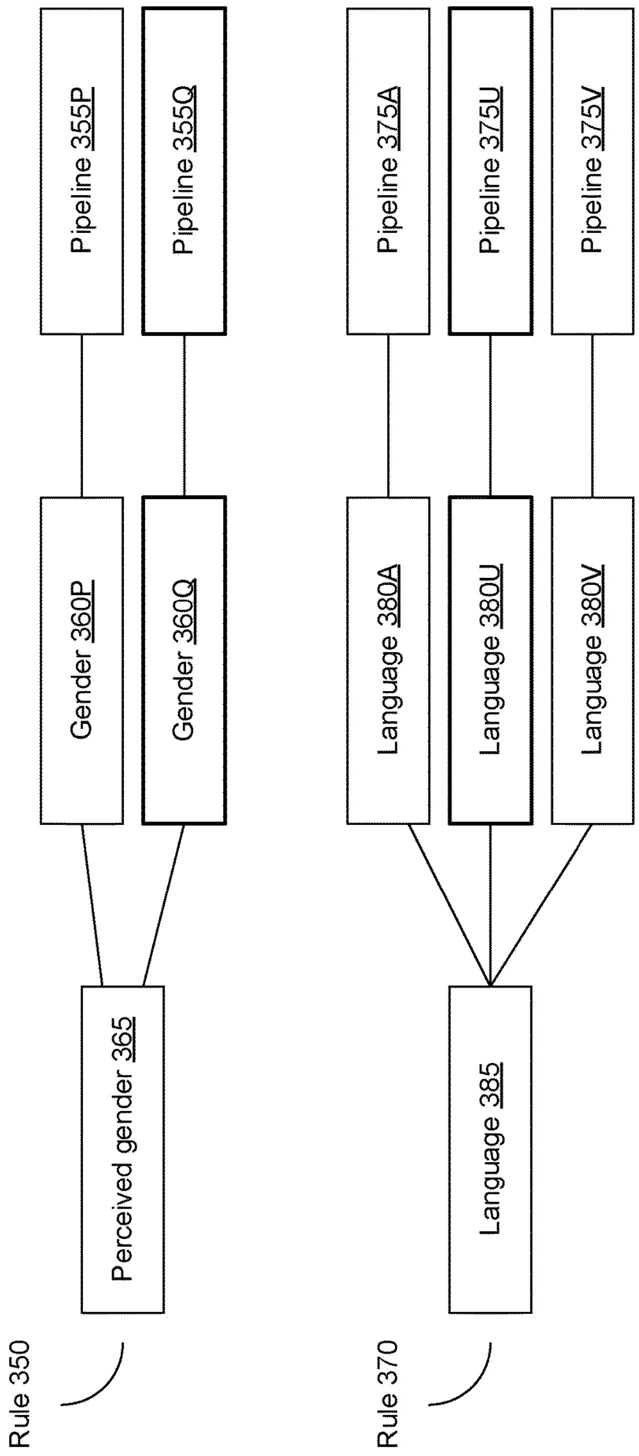

As schematically illustrated by FIG. 4, in some implementations, one or more pipeline selection rules may specify the conditions that determine the perceived gender of the speaker of the input audio stream. The perceived gender of the speaker may be characterized by a set of features including the pitch, the average intensity, etc. Accordingly, the rule 350 may identify a pipeline 355Q corresponding to the specified speaker gender patterns 360Q that is matched by the perceived gender of the speaker of the input stream 365. Each speaker gender pattern may specify the feature ranges of specific features of the input audio stream. In an illustrative example, responsive to determining that the perceived speaker gender matches a certain speaker gender pattern, the pipeline selection rule may identify an audio asset synthesizing pipeline that has been trained on the matching speaker gender.

In some implementations, instead of performing a binary gender selection between male and female, a speaker voice similarity of the input data stream may be established with respect to one of the existing audio streams, in order to identify an existing audio stream that closely matches the features of the input data stream. The speaker voice similarity may be established based on a predefined distance metric between the feature vectors of the input audio stream and each of one or more existing audio streams. In some implementations, speaker embeddings may be utilized instead of or in addition to the feature vectors. "Speaker embedding" herein refers to a vector of speaker characteristics of an utterance; the embeddings may be produced by pre-trained neural networks, which are trained on speaker verification tasks. Accordingly, an existing audio stream may be identified, such that is feature vector or embedding vector is closest, based on the predefined distance metric, to the feature vector or embedding vector of the input data stream. The input data stream may then be utilized for training the audio asset synthesizing pipeline that has been previously trained on the identified existing data stream.

In some implementations, one or more pipeline selection rules may specify the conditions that determine the language of the input audio stream. Accordingly, the rule 370 may identify a pipeline 375U corresponding to the specified language 380U that is matched by the language 385 of the input stream.

In some implementations, one or more rules implemented by the rule engine of the pipeline selection functional module 125 may specify one or more requirements to the audio streams that may be utilized for the pipeline training. For example, the required sample rate of the input audio stream may depend upon the use case of the audio assets produced by the pipeline to be trained using the input audio stream. Thus, if the synthesized speech is to be used for menu narration or for a background character such as a public address announcer, the required sample rate may be, e.g., 16000 Hz or 22050 Hz. Conversely, if the synthesized speech is to be used for main characters, the required sample rate may be, e.g., 44100 Hz or 48000 Hz.

Furthermore, if the pipeline is being selected for offline generation of audio assets, such that the elapsed generation time is not critical, the pipeline selection functional module 125 may choose a pipeline which doesn't apply strict requirements to the compute resources (e.g., a pipeline with no graphic processing unit (GPU) inference). Conversely, if the pipeline is being selected for run-time generation of audio assets, the pipeline selection functional module 125 may choose a pipeline which applies heightened requirements to the compute resources (e.g., a pipeline with GPU inference).

In some implementations, the pipeline selection functional module 125 may be implemented as a combination of a rule engine and one or more trainable classifiers. In an illustrative example, should the rule engine to identify a model training pipeline suitable for processing the input audio stream 110 characterized by the set of extracted features 120A-120K, the pipeline selection functional module 125 may apply one or more trainable classifiers for identifying the best suitable pipeline.

Referring again to FIG. 1, the selected pipeline 130 may be trained by the model training functional module 135. Training the pipeline may involve separately training one or more models implementing the pipeline stages and/or training two or more models together. The pipeline stages may be implemented by neural networks. Training a neural network may involve determining or adjusting the values of various network parameters by processing the input audio stream 110. In an illustrative example, the network parameters may include a set of edge weights which increase or attenuate the signals being transmitted through respective edges connecting artificial neurons.

The trained pipeline 140 undergoes the quality evaluation by the quality evaluation functional module 145. In an illustrative example, the quality evaluation functional module 145 may determine values of certain parameters of one or more audio assets produced by the trained pipeline, and compare the determined values with respective target values of reference ranges. Responsive to determining that one or more parameter values are found outside their reference ranges and/or fail to match the respective target values, the pipeline may be further trained responsive to determining, by functional module 155, that new training data represented by the audio stream 160 is available. In an illustrative example, the audio stream 160 may comprise one or more voice recording of one or more players of an interactive video game for which the audio assets are being synthesized by the pipeline 130. In some implementations, the pipeline may be trained by a combination of the new training data (e.g., at least part of the audio stream 160) and the previously used training data (e.g., at least part of the audio stream 110).

The training data (e.g., a combination of the audio stream 160 and audio stream 110) may be fed to the feature extraction functional module 115, and the workflow 100 may be repeated. In some implementations the feature extraction 115, pipeline selection 125, model training 135, and quality evaluation 145 operations are iteratively repeated until the quality evaluation 145 functional block determines that the parameter values are found within the reference ranges and/or match the respective target values. The trained pipeline may be used by the audio asset synthesis functional module 150 for synthesizing audio assets. In an illustrative example, one or more assets synthesized by the audio asset synthesis functional module 150 may be transmitted, by an interactive video game server, to one or more interactive video game client devices.

Figure 5:
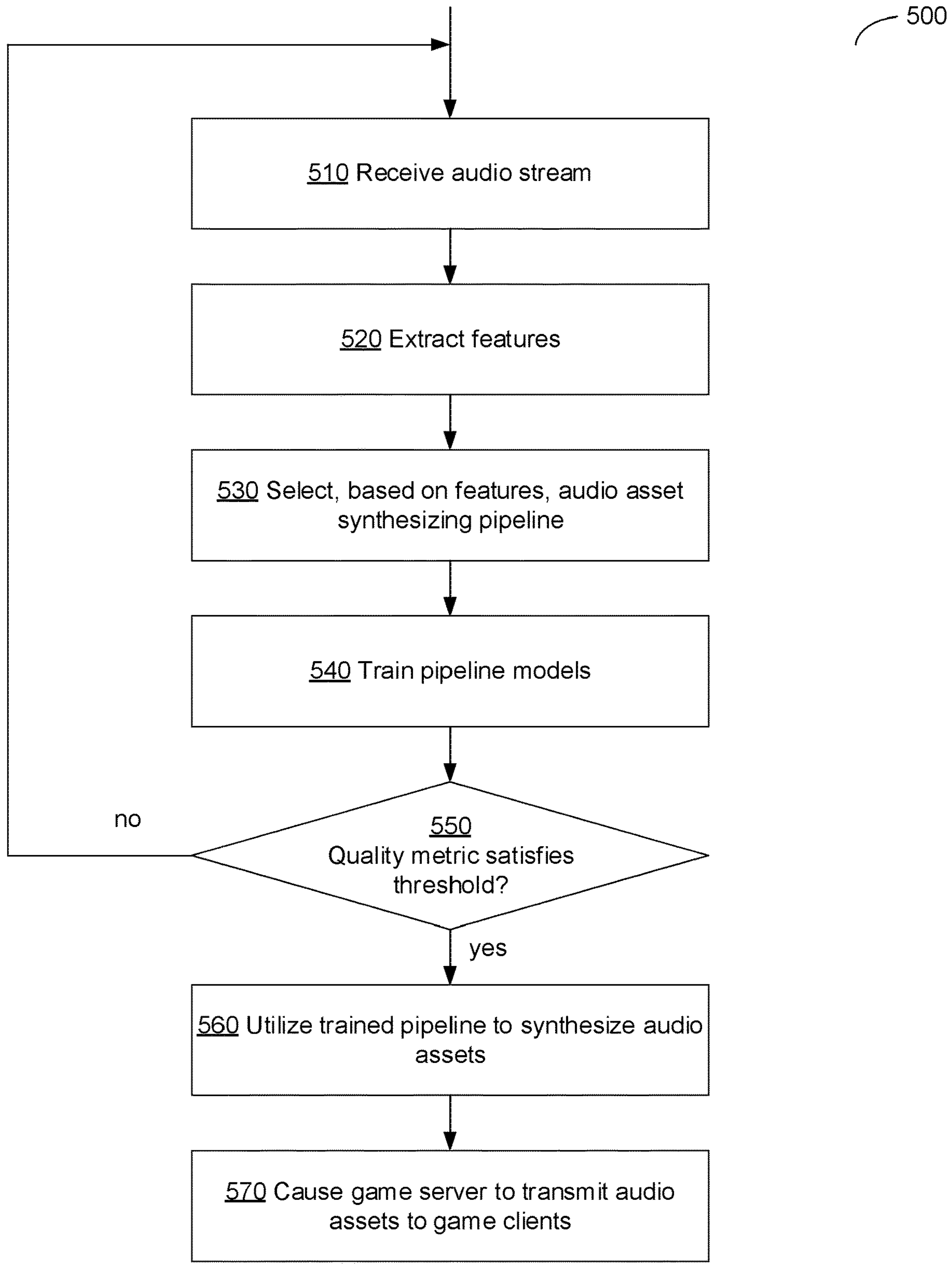
FIG. 5 depicts an example method of automated selection of pipelines for synthesis of audio assets, in accordance with one or more aspects of the present disclosure.

FIG. 5 depicts an example method of automated selection of TTS/VC pipelines for synthesis of audio assets, in accordance with one or more aspects of the present disclosure. Method 500 and/or each of its individual functions, routines, subroutines, or operations may be performed by one or more processors of a computing device (e.g., computing device 500 of FIG. 5). In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other. Therefore, while FIG. 5 and the associated description lists the operations of method 500 in certain order, various implementations of the method may perform at least some of the described operations in parallel and/or in arbitrary selected orders.

As schematically illustrated by FIG. 5, at block 510, the computer system implementing the method receives an audio stream comprising human speech. In an illustrative example, the audio stream comprises one or more voice recording by one or more players of an interactive video game.

At block 520, the computer system extracts one or more features of the audio stream. In various illustrative examples, the features may include: the size of the audio stream, the language of the human speech comprised by the audio stream, the perceived gender of the speaker that produced at least part of the human speech comprised by the audio stream, the style of the human speech comprised by the audio stream, and/or the sampling rate of the audio stream, as described in more detail herein above.

At block 530, the computer system selects, based on the one or more features of the audio stream, an audio asset synthesizing pipeline. The audio asset synthesizing pipeline may comprise a text-to-speech model and/or a voice conversion model. Selecting the audio asset synthesizing pipeline may involve applying a set of rules to the one or more features of the audio stream and/or applying a trainable pipeline selection model to the one or more features of the audio stream, as described in more detail herein above.

At block 540, the computer system trains, using the audio stream, one or more audio asset synthesizing models implementing respective stages of the selected audio asset synthesizing pipeline;

Responsive to determining, at block 550, that a quality metric of the audio asset synthesizing pipeline fails to satisfy a predetermined quality condition, the method loops back to block 510, where a new audio stream is received.

Otherwise, responsive to determining, at block 550, that the quality metric of the audio asset synthesizing pipeline satisfies the predetermined quality condition, the computer system, at block 560, utilizes the selected audio asset synthesizing pipeline for synthesizing one or more audio assets.

At block 570, the computer system transmits the synthesized audio assets to a server of the interactive video game, thus causing the server to transmit the audio assets to one or more client devices of the interactive video game.

Figure 6:
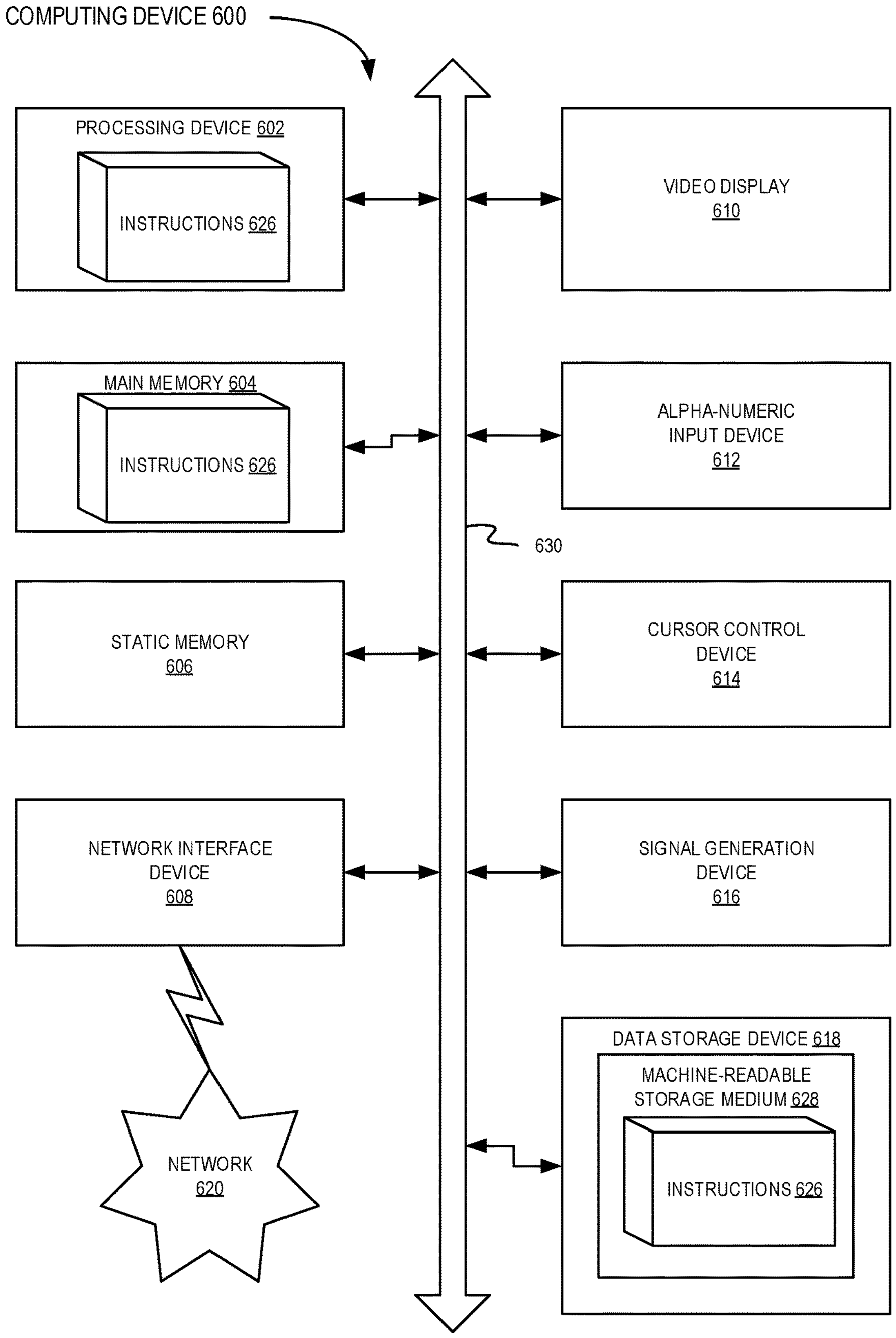
FIG. 6 schematically illustrates a diagrammatic representation of an example computing device which may implement the systems and methods described herein.

FIG. 6 schematically illustrates a diagrammatic representation of a computing device 600 which may implement the systems and methods described herein. Computing device 600 may be connected to other computing devices in a LAN, an intranet, an extranet, and/or the Internet. The computing device may operate in the capacity of a server machine in client-server network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute functional module 626 implementing method 500 of automated selection of TTS/VC pipelines for synthesis of audio assets, in accordance with one or more aspects of the present disclosure.

Computing device 600 may further include a network interface device 606 which may communicate with a network 620. The computing device 600 also may include a video display unit 66 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 66, alphanumeric input device 612, and cursor control device 614 may be combined into a single component or device (e.g., an LCD touch screen).

Data storage device 618 may include a computer-readable storage medium 628 on which may be stored one or more sets of instructions, e.g., instructions of functional module 626 implementing method 500 of automated selection of TTS/VC pipelines for synthesis of audio assets, implemented in accordance with one or more aspects of the present disclosure. Instructions implementing functional module 626 may also reside, completely or at least partially, within main memory 604 and/or within processing device 602 during execution thereof by computing device 600, main memory 604 and processing device 602 also constituting computer-readable media. The instructions may further be transmitted or received over a network 620 via network interface device 606.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating", "identifying", "determining", "sending", "assigning", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:

receiving, by a computer system, an audio stream;

determining one or more features of the audio stream;

for each audio asset synthesizing pipeline of a plurality of audio asset synthesizing pipelines, determining, based on the one or more features of the audio stream, a degree of suitability of the audio stream for training the audio asset synthesizing pipeline;

selecting, among a plurality of audio asset synthesizing pipelines, an audio asset synthesizing pipeline associated with a maximum value of the degree of suitability;

training, using the audio stream, one or more audio asset synthesizing models implementing respective stages of the selected audio asset synthesizing pipeline; and responsive to determining that a quality metric of the audio asset synthesizing pipeline satisfies a predetermined quality condition, synthesizing one or more audio assets by the selected audio asset synthesizing pipeline.

2. The method of claim 1, wherein the audio asset synthesizing pipeline comprises at least one of: a text-to-speech model or a voice conversion model.

3. The method of claim 1, wherein selecting the audio asset synthesizing pipeline further comprises:

applying a set of rules to the one or more features of the audio stream.

4. The method of claim 1, wherein selecting the audio asset synthesizing pipeline further comprises:

applying a trainable pipeline selection model to the one or more features of the audio stream.

5. The method of claim 1, further comprising:

responsive to determining that the quality metric of an audio asset synthesizing model of the one or more audio asset synthesizing models fails to satisfy the predetermined quality condition, receiving a second audio stream of human speech; and training, using the audio stream and the second audio stream, the audio asset synthesizing model of the selected audio asset synthesizing pipeline.

6. The method of claim 1, further comprising:

responsive to determining that the quality metric of an audio asset synthesizing model of the one or more audio asset synthesizing models fails to satisfy the predetermined quality condition, iteratively repeating the receiving, determining, selecting, and training operations until the quality metric of the audio asset synthesizing model satisfies the predetermined quality condition.

7. The method of claim 1, wherein the one or more features of the audio stream comprise a size of the audio stream.

8. The method of claim 1, wherein the one or more features of the audio stream comprise a language of human speech comprised by the audio stream.

9. The method of claim 1, wherein the one or more features of the audio stream comprise a perceived gender of a speaker that produced at least part of human speech comprised by the audio stream.

10. The method of claim 1, wherein the one or more features of the audio stream comprise a style of human speech comprised by the audio stream.

11. The method of claim 1, wherein the one or more features of the audio stream comprise a sampling rate of the audio stream.

12. The method of claim 1, wherein the audio stream comprises one or more voice recording of one or more players of an interactive video game.

13. The method of claim 12, further comprising:

causing a server of the interactive video game to transmit the one or more audio assets to one or more client devices of the interactive video game.

14. A computer system, comprising:

a memory; and a processor, communicatively coupled to the memory, the processor configured to:

receive an audio stream comprising human speech;

determine one or more features of the audio stream;

generate, based on the one or more features of the audio stream, a pipeline affinity vector, wherein each pipeline affinity vector element of the pipeline affinity vector reflects a degree of suitability of the audio stream for training an audio asset synthesizing pipeline identified by an index of the pipeline affinity vector element;

select an audio asset synthesizing pipeline identified by a pipeline affinity vector element corresponding to a maximum value of the degree of suitability; and train, using the audio stream, one or more audio asset synthesizing models implementing respective stages of the selected audio asset synthesizing pipeline.

15. The computer system of claim 14, wherein the audio asset synthesizing pipeline comprises at least one of: a text-to-speech model or a voice conversion model.

16. The computer system of claim 14, wherein selecting the audio asset synthesizing pipeline further comprises at least one of: applying a set of rules to the one or more features of the audio stream or applying a trainable pipeline selection model to the one or more features of the audio stream.

17. The computer system of claim 14, wherein the processor is further configured to:

responsive to determining that a quality metric of audio asset synthesizing model of the one or more audio asset synthesizing models fails to satisfy a predetermined quality condition, receive a second audio stream of human speech; and train, using the second audio stream, the audio asset synthesizing model of the selected audio asset synthesizing pipeline.

18. The computer system of claim 14, wherein the one or more features of the audio stream comprise at least one of: a size of the audio stream, a language of the human speech comprised by the audio stream, a perceived gender of a speaker that produced at least part of the human speech comprised by the audio stream, a style of the human speech comprised by the audio stream, or a sampling rate of the audio stream.

19. A computer-readable non-transitory storage medium comprising executable instructions that, when executed by a computer system, cause the computer system to:

receive an audio stream;

determine one or more features of the audio stream;

for each audio asset synthesizing pipeline of a plurality of audio asset synthesizing pipelines, determine, based on the one or more features of the audio stream, a degree of suitability of the audio stream for training the audio asset synthesizing pipeline;

select, among a plurality of audio asset synthesizing pipelines, an audio asset synthesizing pipeline associated with a maximum value of the degree of suitability;

train, using the audio stream, one or more audio asset synthesizing models implementing respective stages of the selected audio asset synthesizing pipeline; and responsive to determining that a quality metric of the audio asset synthesizing pipeline satisfies a predetermined quality condition, synthesize one or more audio assets by the selected audio asset synthesizing pipeline.

20. The computer-readable non-transitory storage medium of claim 19, wherein selecting the audio asset synthesizing pipeline further comprises performing at least one of: applying a set of rules to the one or more features of the audio stream or applying a trainable pipeline selection model to the one or more features of the audio stream.

* * * * *